(12) United States Patent
Kruglick

(10) Patent No.: US 9,094,888 B2
(45) Date of Patent: Jul. 28, 2015

(54) WIRELESS DEVICE HANDOFF BETWEEN WIRELESS NETWORKS

(75) Inventor: Ezekiel Kruglick, Poway, CA (US)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 384 days.

(21) Appl. No.: 13/263,835

(22) PCT Filed: Apr. 29, 2011

(86) PCT No.: PCT/US2011/034470
§ 371 (c)(1),
(2), (4) Date: Oct. 10, 2011

(87) PCT Pub. No.: WO2012/148410
PCT Pub. Date: Nov. 1, 2012

(65) Prior Publication Data
US 2012/0276901 A1 Nov. 1, 2012

(51) Int. Cl.
*H04W 36/00* (2009.01)
*H04W 36/32* (2009.01)
*H04W 16/28* (2009.01)

(52) U.S. Cl.
CPC .............. *H04W 36/32* (2013.01); *H04W 16/28* (2013.01); *H04W 36/0055* (2013.01)

(58) Field of Classification Search
CPC ..... H04W 36/32; H04W 36/30; H04W 36/18; H04W 36/08; H04W 36/14; H04W 36/12
USPC .............................. 455/436–443, 67.11, 226.2
See application file for complete search history.

(56) References Cited

U.S. PATENT DOCUMENTS

| | | | |
|---|---|---|---|
| 6,438,389 B1 | 8/2002 | Sandhu et al. | |
| 6,829,481 B2 | 12/2004 | Souissi | |
| 2002/0187780 A1 | 12/2002 | Souissi | |
| 2006/0148451 A1 | 7/2006 | Narasimha | |
| 2007/0021119 A1 | 1/2007 | Lee et al. | |
| 2008/0076430 A1 | 3/2008 | Olson | |
| 2008/0273506 A1 | 11/2008 | Kezys | |
| 2008/0310371 A1 | 12/2008 | Russell | |
| 2009/0017823 A1 | 1/2009 | Sachs et al. | |
| 2009/0111469 A1 | 4/2009 | Lee et al. | |
| 2010/0093354 A1* | 4/2010 | Agashe et al. | 455/436 |
| 2012/0149430 A1* | 6/2012 | Siomina et al. | 455/525 |
| 2013/0107865 A1* | 5/2013 | Diachina et al. | 370/331 |
| 2014/0169267 A1* | 6/2014 | Zhang et al. | 370/315 |

FOREIGN PATENT DOCUMENTS

EP 1643785 A1 4/2006
JP 2006086910 A 3/2006
(Continued)

OTHER PUBLICATIONS

Australia Patent Office, International Search Report and Written Opinion of the International Searching Authority for PCT/US2011/034470, prepared on Jul. 27, 2011, Australia.
Cheng, Sheng-Tzong et al., IPv6-based dynamic coordinated call admission control mechanism over integrated wireless networks, IEEE Journal on Selected Areas in Communications 23, No. 11 (Nov. 2005): pp. 2093-2103.

(Continued)

*Primary Examiner* — Temica M Beamer
(74) *Attorney, Agent, or Firm* — Brundidge & Stanger, P.C.

(57) ABSTRACT

Examples are disclosed for a wireless device handoff between a first wireless network and a second wireless network.

29 Claims, 9 Drawing Sheets

(56) References Cited

FOREIGN PATENT DOCUMENTS

| JP | 2008252330 A | 10/2008 |
| KR | 1020060038729 A | 5/2006 |
| KR | 1020090041777 A | 4/2009 |
| WO | 2007066882 A1 | 6/2007 |
| WO | 2010121885 A1 | 10/2010 |
| WO | 2010123417 A1 | 10/2010 |

OTHER PUBLICATIONS

Mohanty, S. et al., A cross-layer (layer 2+ 3) handoff management protocol for next-generation wireless systems, IEEE Transactions on Mobile Computing 5, No. 10 (2006): 1347-1360.

Ferrus, R., Vertical handover support in coordinated heterogeneous radio access networks, Proceedings of the 14th IST Mobile and Wireless Communications Summit, Jun. 2005, Dresden, Germany, accessed online via http://www.eurasip.org/Proceedings/Ext/IST05/papers/430.pdf on Oct. 10, 2011.

* cited by examiner

600 A computer program product.

602 A signal bearing medium.

604 instructions for a first wireless network to handoff a wireless device to a second wireless network, which, when executed by logic, cause the logic to:

receive coverage information associated with the wireless device;

determine whether the wireless device is possibly covered by the second wireless network based, at least in part, on the coverage information; or transmit a handoff request to the second wireless network based, at least in part, on a determination that the wireless device is possibly covered by the second wireless network.

| 606 a computer-readable medium. | 608 a recordable medium. | 610 a communications medium. |

FIG. 6

WIRELESS DEVICE HANDOFF BETWEEN WIRELESS NETWORKS

CROSS-REFERENCE TO RELATED APPLICATIONS

This Application is the National Stage filing under 35 U.S.C. §371 of PCT Application Ser. No. PCT/US2011/034470 filed on Apr. 29, 2011.

BACKGROUND

Unless otherwise indicated herein, the approaches described in this section are not prior art to the claims in this application and are not admitted to be prior art by inclusion in this section.

Complex wireless communication systems may be deployed such that coverage areas for different types of wireless networks ("heterogeneous wireless networks") included in the wireless communication systems may at least temporarily overlay or overlap. These complex wireless communication systems may include at least some wireless networks using adaptive antenna capabilities to allow for active beamforming. The active beamforming, for example, may be in response to user traffic patterns and other system management strategies. Also, some wireless networks may include towers with antenna arrays having dozens of constantly changing sectors of coverage due to active beamforming. As a result of the constantly changing sectors of coverage, a wireless device may able to detect a wireless network at a location at a given period of time. But as the sectors of coverage change, the wireless device may no longer detect the wireless network at the same location at another given period of time.

SUMMARY

The present disclosure describes example methods to be implemented at a first wireless network to handoff a wireless device to a second wireless network. The methods may include receiving coverage information associated with the wireless device and determining whether the wireless device is capable of being covered by the second wireless network based, at least in part, on the received coverage information. A handoff request may then be transmitted to the second wireless network based, at least in part, on the determination that the wireless device is capable of being covered by the second wireless network.

The present disclosure also describes example methods to be implemented at a first wireless network for a wireless device handoff between a second wireless network and the first wireless network. The methods may include receiving a handoff request from the second wireless network, the handoff request based, at least in part, on a determination by the second wireless network that the wireless device is not currently covered by the first wireless network but is capable of being covered by the first wireless network. Based, at least in part, on the handoff request, one or more beams of an antenna array may be adapted to facilitate coverage of the wireless device by the first wireless network. The wireless device may then be handed off from the second wireless network to the first wireless network.

The present disclosure also describes example devices for a first wireless network to handoff a wireless device to a second wireless network. The example devices may have a coverage manager that has logic. The logic may be configured to receive coverage information associated with the wireless device and determine whether the wireless device is possibly capable of being covered by the second wireless network based, at least in part, on the coverage information. The logic may also be configured to transmit a handoff request to the second wireless network based, at least in part, on the determination that the wireless device is possibly capable of being covered by the second wireless network.

The present disclosure also describes example systems for a wireless device handoff between a first wireless network and a second wireless network. The example systems may include an antenna array configured to generate one or more adaptable beams to modify a coverage area for the first wireless network. The example systems may also include an adaption manager. The adaption manager may have logic configured to receive a handoff request from the second wireless network, the handoff request based, at least in part, on a determination by the second wireless network that the wireless device is capable of being covered by the first wireless network. The logic may also be configured to cause a beam from among the one or more adaptable beams to be adapted in order to enable the wireless device to be covered by the first wireless network. The logic may further be configured to transmit a confirmation to the second wireless network to indicate acceptance of the handoff request and the wireless device may then be handed off from the second wireless network to the first wireless network.

The present disclosure also describes example computer program products. In some examples, the computer program products may include a signal bearing medium having instructions for a first wireless network to handoff a wireless device to a second wireless network. The instructions, which, when executed by logic may cause the logic to receive coverage information associated with the wireless device. Responsive to the received indication, the instructions may also cause the logic to determine whether the wireless device is possibly covered by the second wireless network based, at least in part, on the coverage information. The instructions may then cause the logic to transmit a handoff request to the second wireless network based, at least in part, on a determination that the wireless device is possibly covered by the second wireless network.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

FIG. 6 illustrates a block diagram of an example computer program product; and

DETAILED DESCRIPTION

Figure 1A:
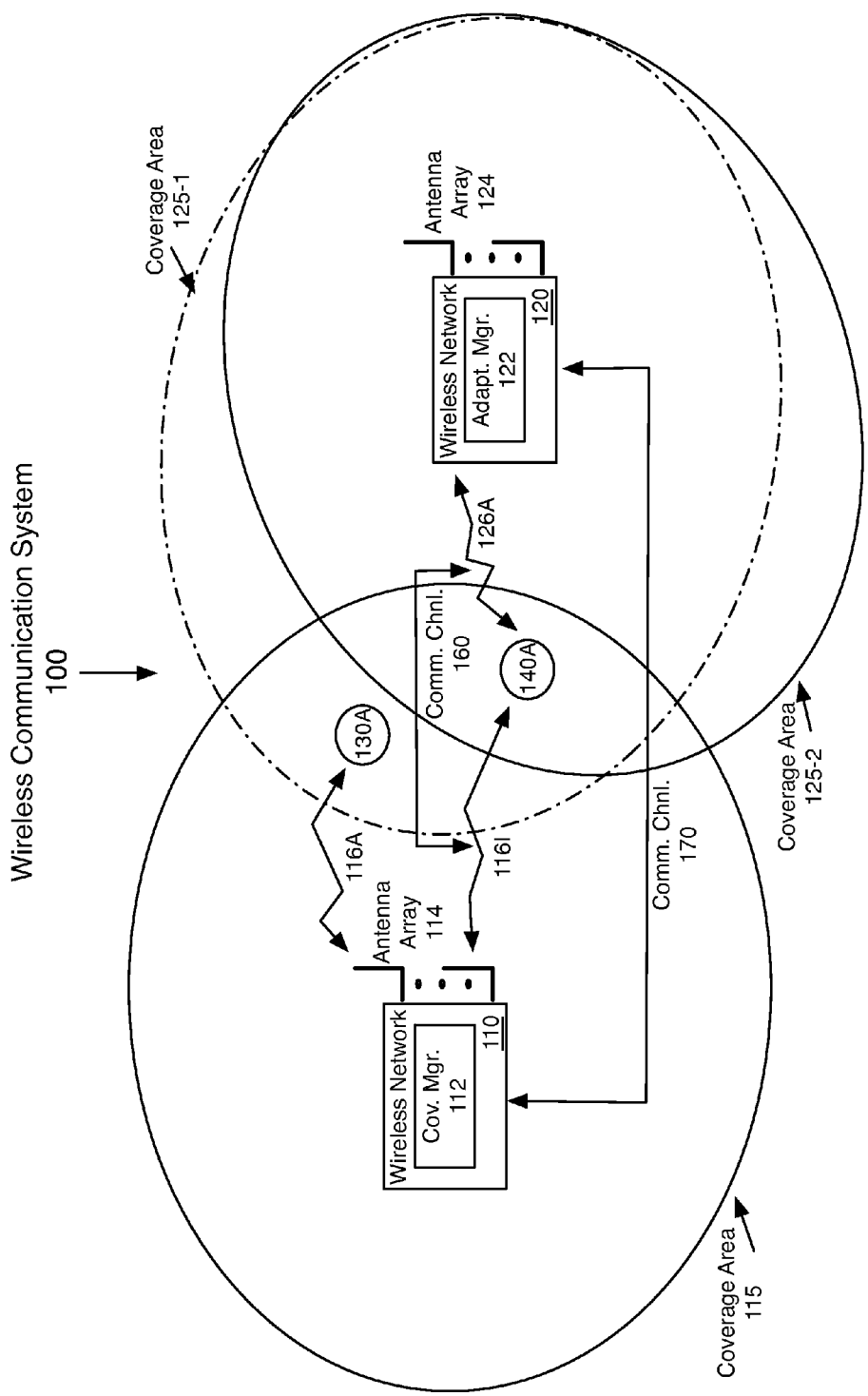
FIGS. 1A-C illustrate an example wireless communication system that includes two wireless networks.

In the following detailed description, reference is made to the accompanying drawings, which form a part hereof. In the drawings, similar symbols typically identify similar components, unless context dictates otherwise. The illustrative examples or embodiments described in the detailed description, drawings, and claims are not meant to be limiting. Other examples or embodiments may be utilized, and other changes may be made, without departing from the spirit or scope of the subject matter presented here. It will be readily understood that aspects of this disclosure, as generally described herein, and illustrated in the Figures, can be arranged, substituted, combined, and designed in a wide variety of different configurations, all of which are explicitly contemplated and make part of this disclosure.

This disclosure is drawn, inter alia, to methods, apparatus, systems and computer program products related to a wireless device handoff between a first wireless network and a second wireless network.

As contemplated in the present disclosure, constantly changing sectors of coverage may result in a wireless device being able to detect a wireless network at a location at a given period of time. However, as the sectors of coverage change, the wireless device may no longer detect the wireless network at the same location at another given period of time. Thus, beamforming or beam shaping may cause handoff challenges for a wireless device to possibly be handed off to the wireless network.

In some examples, methods are implemented at a first wireless network to handoff a wireless device to a second wireless network. The methods may include receiving coverage information associated with the wireless device and determining whether the wireless device is capable of being covered by the second wireless network based, at least in part, on the received coverage information. A handoff request may then be transmitted to the second wireless network based, at least in part, on the determination that the wireless device is capable of being covered by the second wireless network. For some examples, a confirmation may then be received that indicates the handoff request has been accepted by the second wireless network. The wireless device may then be handed off to the second wireless network based, at least in part, on the received confirmation.

In some other examples, methods are implemented at a first wireless network for a wireless device handoff between a second wireless network and the first wireless network. The methods may include receiving a handoff request from the second wireless network, the handoff request based, at least in part, on a determination by the second wireless network that the wireless device is not currently covered by the first wireless device but is capable of being covered by the first wireless network. Based, at least in part, on the handoff request, one or more beams of an antenna array may be adapted to facilitate coverage of the wireless device by the first wireless network. The wireless device may then be handed off from the second wireless network to the first wireless network.

Figure 1B:
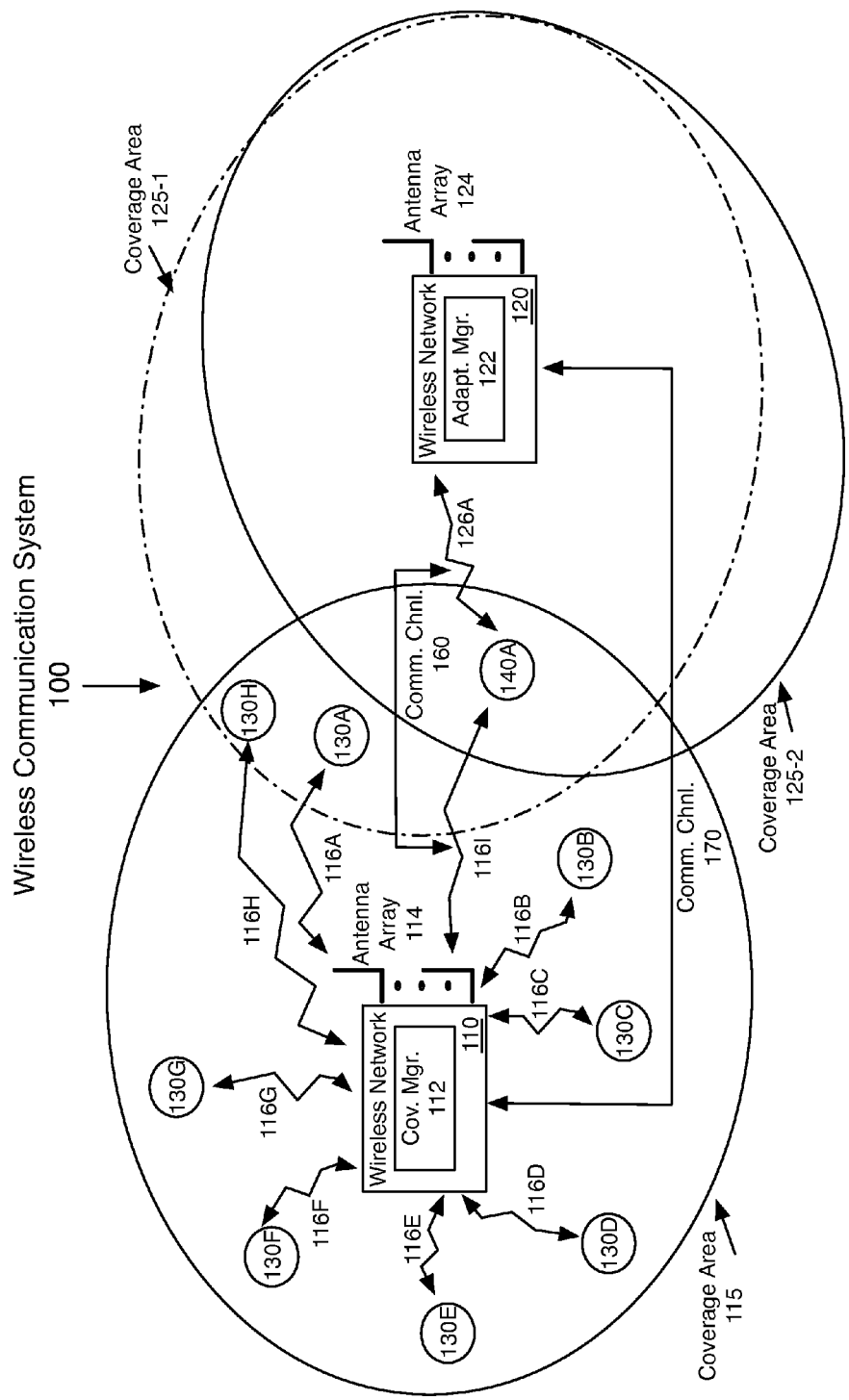
Figure 1C:
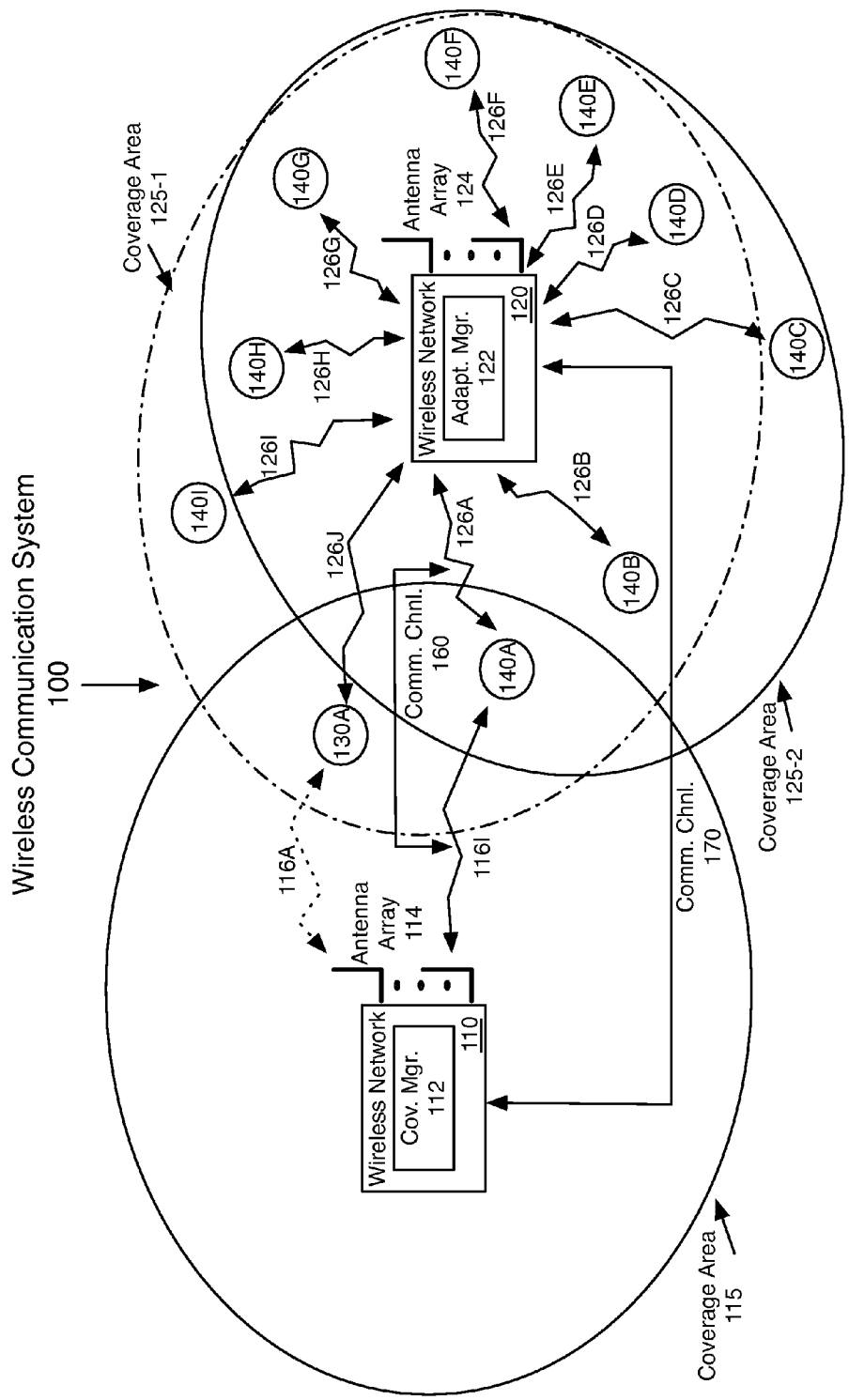

FIGS. 1A-C illustrate an example wireless communication system 100 that includes wireless networks 110 and 120. As shown in FIGS. 1A-C, wireless network 110 includes a coverage manager 112 and an antenna array 114. Also, wireless network 120 includes an adaption manager 122 and an antenna array 124. In some examples, wireless network 110 may have a coverage area indicated in FIGS. 1A-C as coverage area 115. Also, for these examples, the antenna array 124 of wireless network 120 may be adaptable (e.g., via beamforming) to enable wireless network 120 to have variable coverage areas. These variable coverage areas are shown in FIGS. 1A-C as coverage area 125-1 and coverage area 125-2.

According to some examples, as shown in FIGS. 1A-C, wireless device 130A may communicatively couple to wireless network 110 via communication link 116A. Also, wireless device 140A may communicatively couple to wireless network 120 via communication link 126A. In some examples, wireless device 140A may also be communicatively coupled to network 110 via communication link 116I. As described more below, since wireless device 140A may be communicatively coupled to both wireless networks, a communication channel 160 may be established that includes communication links 116I and 126A. Either wireless network 110 or wireless network 120 may use wireless device 140A as a relay to communicate with the other wireless network via communication channel 160. Additionally and/or alternatively, wireless network 110 may be communicatively coupled to wireless network 120 via communication channel 170 as shown in FIGS. 1A-C.

In some examples, wireless networks 110 and 120 may be wireless base-stations that operate and/or may be separately associated with heterogeneous wireless networks. Wireless networks 110 and 120 may be heterogeneous based on each wireless network possibly operated by different network service providers and/or in accordance with different types of wireless network technologies. For these examples, the different network service providers may be able to handoff wireless devices between the different wireless networks but may not share operating characteristics such as current and past coverage areas One type of wireless network technology may be described in an industry standard known as Institute of Electrical and Electronics Engineers (IEEE) 802.16-2009 and may be referred to as "WiMax". Another type of wireless network technology may be described in one or more industry standards associated with the $3^{rd}$ Generation Partnership Project such as GSM, GPRS, EDGE, W-CDMA, HSPA, LTE or LTE-Advanced and may be referred to as "3GPP". Yet another type of wireless network technology may be described in one or one or more industry standards associated with the $3^{rd}$ Generation Partnership Project 2 such as CDMA-2000, EV-DO, EV-DO Rev. A or EV-DO Rev. B and may be referred to as "3GPP2". WiMax, 3GPP or 3GPP3 types of wireless networks may also be referred to as wireless wide area networks (WLANs). Although this disclosure is not limited to only the above-mentioned standards and types of wireless networks.

As mentioned above, wireless networks 110 and 120 may be coupled via communication channels 160 and/or 170. In some examples, communication channels 160 and 170 may operate in compliance with one or more industry standards. The one or more industry standards may be associated with 3GPP, 3GPP2, IEEE 802.11-2007, or IEEE 802.16-2009 or may be associated with other industry standards such as standards associated with IEEE 802.1. In some examples, communication channels 160 and 170 may include wireless and/or wired communication links to couple wireless networks 110 and 120 and these communication links may also be configured to operate in compliance with standards associated with 3GPP, 3GPP2, IEEE 802.11-2007, IEEE 802.16-2009 or IEEE 802.1. Although this disclosure is not limited to only the above-mentioned standards. As an example, the communication channel 170 may be used in an LTE wireless communication system as a network X1 channel. The network X1 channel may be used for instances where heterogeneous wireless networks coordinate/manage base-station to base-station communications between wireless networks.

In some examples, coverage manager 112 may be co-located with a base-station associated with wireless network 110. In other examples, although not shown in FIGS. 1A-C, coverage manager 112 may be located with control elements (e.g., a wireless communication system head end) that may remotely manage and/or control wireless network 110. For these other examples, coverage manager 112 may be located remote to antenna array 114, which provides coverage area 115 for wireless network 110. Similarly, adaption manager 122 may be co-located with a base-station associated with wireless network 120. Also, in other examples, adaption manager 122 may be located with control elements that may remotely manage and/or control wireless network 120. For these other examples, adaption manager 122 may be located remote to antenna array 124, which provides coverage areas 125-1 and 125-2 for wireless network 120.

In some examples, coverage area 125-1 may indicate a coverage area for network 120 for a past time period and coverage area 125-2 may indicate a coverage area for a current or present time period. Although this disclosure is not limited to a wireless network having two coverage areas over past and present time periods, but may include any number of coverage areas over any number of time periods. As mentioned previously, antenna array 124 of wireless network 120 may be adaptable (e.g., via beamforming) to enable wireless network 120 to have variable coverage areas. As a result of the variable coverage areas, wireless device 130A, as shown in FIG. 1A, is within past coverage area 125-1 but is outside of current coverage area 125-2. Thus, although wireless device 130A is not currently covered by wireless network 120, past coverage area 125-1 indicates that network 120 may be capable of providing coverage.

FIG. 1B depicts a view of wireless communication system 100 that shows numerous wireless devices communicatively coupled to wireless network 110. As shown in FIG. 1A, wireless devices 130A-H and 140A may couple to wireless network 110 via communication links 116A-I. In some examples, as described more below, coverage manager 112 of wireless network 110 may include logic and/or features configured to receive coverage information from wireless devices 130A-H and 140A to generate a coverage map to indicate possible coverage areas for neighboring wireless networks such as wireless network 120. The coverage information received from a given wireless device may include information such as a location for the given wireless device, whether a signal from one or more neighboring wireless networks can be detected (e.g., strong enough to communicatively couple with the one or more neighboring wireless networks) or an indication of signal strength from the one or more neighboring wireless networks.

In some examples, as shown in FIG. 1B, wireless devices 130A and 130H are in coverage area 125-1. As a result of being in coverage area 125-1, coverage information from wireless devices 130A and 130H may indicate that network 120 did provide coverage to these wireless devices at a past time period and this information may be indicated on the coverage map generated as described above. Therefore, although coverage area 125-2 indicates no coverage for wireless devices 130A and 130H at present, coverage manager 112 may be configured to determine that wireless device 130A and/or wireless device 130H may be capable of being covered by wireless network 120 based at least on the coverage map.

According to some examples, it may be determined that wireless device 130 and/or wireless network 110 would benefit from the handoff of wireless device 130 to wireless network 120. For example, wireless device 130 may obtain a stronger signal from wireless network 120 or wireless network 110 may be overburdened and may need to reduce the number of wireless devices coupled to its network. Also, wireless device 130 may be a mobile wireless device and coverage map information may indicate that wireless device 130 may be moving towards wireless network 120 and away from wireless network 110.

Coverage manager 112 of wireless network 110, as mentioned above, may have already determined that wireless device 130A may be capable being covered by wireless network 120. As a result of wireless network 120 being capable of covering wireless device 130A, coverage manager 112 may include logic and/or features to transmit a handoff request to wireless network 120. The handoff request, for example, may be transmitted via communication channel 160 or 170. As described more below, adaption manager 122 of wireless network 120 may include logic and/or features configured to receive the handoff request and determine whether to adapt antenna array 124 to facilitate coverage of wireless device 130A. If a determination was made to adapt antenna array 124, adaption manager 122 may transmit a confirmation (e.g., via communication channel 160 or 170) to indicate acceptance of the handoff request. The coverage area for wireless network 120 may now be similar to coverage area 125-1 and wireless device 130A may then be handed off from wireless network 110 to wireless network 120.

FIG. 1C depicts a view of wireless communication system 100 that shows numerous wireless devices communicatively coupled to wireless network 120. As shown in FIG. 1C, wireless devices 140A-I and 130A may couple to wireless network 120 via communication links 126A-J. In some examples, as described more below, adaption manager 122 of wireless network 120 may include logic and/or features configured to receive a handoff request from wireless network 110 (e.g., via communication channel 160 or 170). As described above, the handoff request may be based on a determination by wireless network 110 that wireless device 130A may not be currently covered by wireless network 120 but may be capable of being covered by wireless network 120. Adaption manager 122 may also include logic and/or features to adapt one or more beams of antenna array 124 to adjust wireless network 120's coverage area (e.g., back to coverage area 125-1) based at least on the handoff request. For example, the one or more beams of antenna array 124 may be configured to provide directional signal transmissions for wireless network 120 via the use of beamforming techniques to include, but not limited to, the use of conventional beamformers or adaptive beamformers.

In some examples, adaption manager 122 may adapt the one or more beams of antenna array 124 based on certain criteria. For example, adaption manager 122 may include logic and/or features configured to predetermine criteria such as what network load would be placed on wireless network 120 if wireless device 130A was handed off from wireless network 110. The network load, for example, may be based on an estimate of an average load for wireless devices in general (e.g., based on historical network data) or may be based on information included in the handoff request received from wireless network 110.

According to some examples, adaption manager 122 may also include logic and/or features to determine an effect of adapting one or more beams may have on wireless devices 140A-I. For example, as shown in FIG. 1C, wireless device 140C may be within coverage area 125-2. However, if the one or more beams of antenna array 124 are adapted to adjust the coverage area back to coverage area 125-1, wireless device 140C is outside of this coverage area. Since wireless device 140C may no longer be covered, adaption manager 122 may determine not to adapt the one or more beams. Hence, a confirmation to indicate an acceptance will not be transmitted to wireless network 110. Alternatively, if adaption manager 122 values the addition of wireless device 130A higher than the subtraction of wireless device 140C (e.g., wireless device 130A may be a more profitable/preferred user), a confirmation may be transmitted to wireless network 110. The coverage area for wireless network 120 may then be adjusted to be similar to coverage area 125-1 and wireless device 130A may then be handed off from wireless network 110 to wireless network 120.

In some examples, wireless devices 130A-I or wireless devices 140A-J may be mobile or stationary wireless devices, e.g., a computer, laptop, netbook, e-book, tablet-PC, small-form factor portable (or mobile) electronic device such as a cell phone, smart phone, a personal data assistant (PDA), a personal media player device, a wireless web-watch device, a personal headset device, an application specific device, or a hybrid device that may include any of the above functions.

Figure 2:
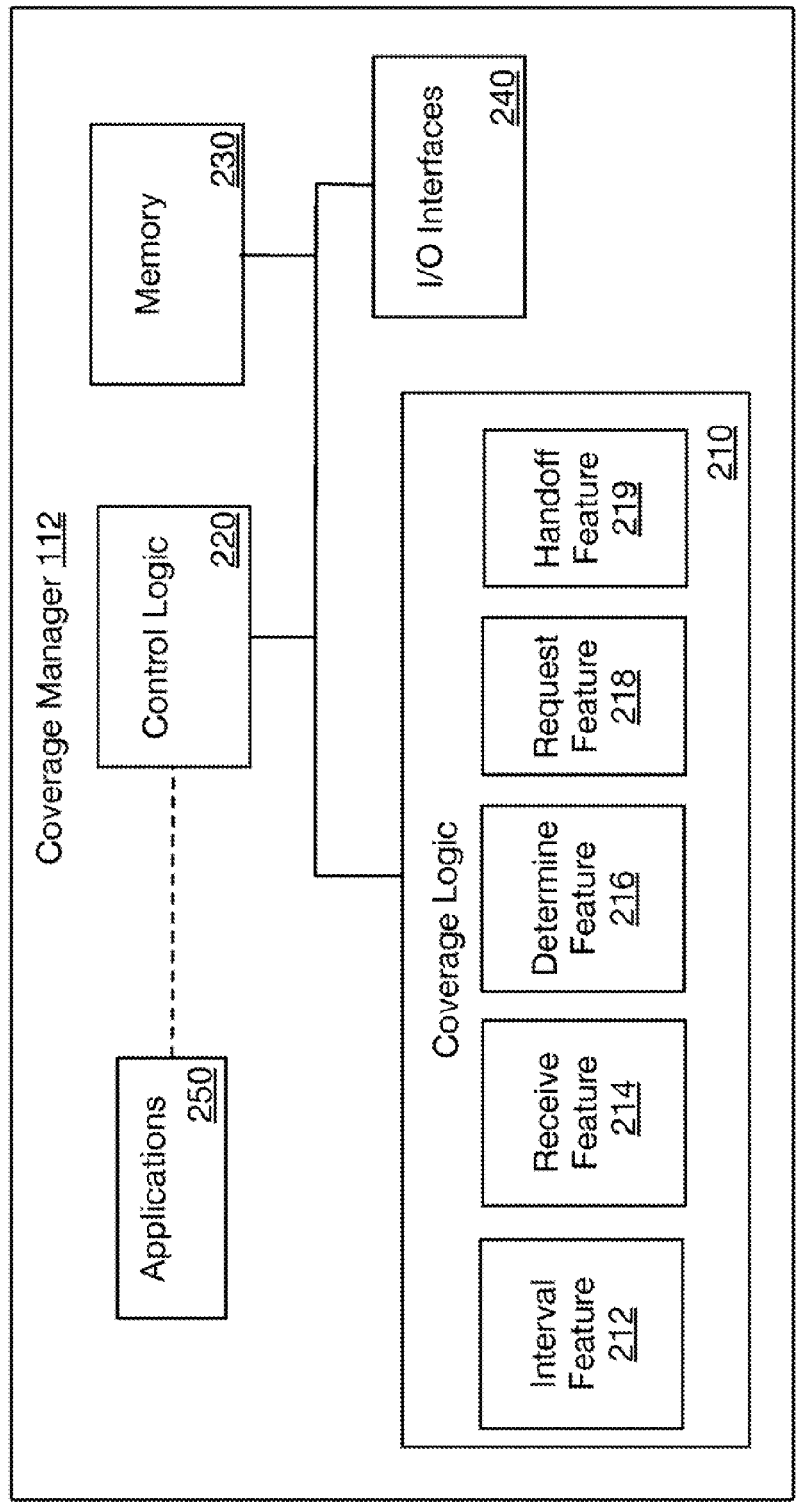
FIG. 2 illustrates a block diagram of an example architecture for a coverage manager.

FIG. 2 illustrates a block diagram of an example architecture for a coverage manager 112. As described above for wireless communication system 100 in FIGS. 1A-C, wireless network 110 may include a coverage manager 112. In some examples, coverage manager 112 includes features and/or logic configured or arranged for a first wireless network (e.g., wireless network 110) to handoff a wireless device to a second wireless network (e.g., wireless network 120).

The example coverage manager 112 of FIG. 2, includes coverage logic 210, control logic 220, memory 230, input/output (I/O) interfaces 240 and optionally one or more applications 250. As illustrated in FIG. 2, coverage logic 210 is coupled to control logic 220, memory 230 and I/O interfaces 240. Also illustrated in FIG. 2, the optional applications 250 are arranged in cooperation with control logic 220. Coverage logic 210 may further include one or more of an interval feature 212, a receive feature 214, a determine feature 216, a request feature 218 or a handoff feature 219, or any reasonable combination thereof.

In some examples, the elements portrayed in FIG. 2's block diagram are configured to support or enable coverage manager 112 as described in this disclosure. A given coverage manager 112 may include some, all or more elements than those depicted in FIG. 2. For example, coverage logic 210 and control logic 220 may separately or collectively represent a wide variety of logic device(s) to implement the features of coverage manager 112. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 2, coverage logic 210 includes one or more of an interval feature 212, a receive feature 214, a determine feature 216, a request feature 218 or a handoff feature 219. Coverage logic 210 may be configured to use one or more of these features to perform operations. As described in more detail below, example operations may include implementing a handoff of a wireless device between a first wireless network and a second wireless network.

In some examples, control logic 220 may be configured to control the overall operation of coverage manager 112. As mentioned above, control logic 220 may represent any of a wide variety of logic device(s) configured to operate in conjunction with executable content or instructions to implement the control of coverage manager 112. In some alternate examples, the features and functionality of control logic 220 may be implemented within coverage logic 210.

According to some examples, memory 230 is arranged to store executable content or instructions. The executable content or instructions may be used by control logic 220 and/or coverage logic 210 to implement or activate features or elements of coverage manager 112. As described more below, memory 230 may also be arranged to at least temporarily maintain coverage information (e.g., coverage maps). The coverage information may be associated with a plurality of wireless devices coupled to a wireless network (e.g., wireless network 110).

Memory 230 may include a wide variety of memory media including, but not limited to, one or more of volatile memory, non-volatile memory, flash memory, programmable variables or states, random access memory (RAM), read-only memory (ROM), or other static or dynamic storage media.

In some examples, I/O interfaces 240 may provide an interface via an internal communication medium or link between a coverage manager 112 and elements resident on or co-located with coverage manager 112. For example, I/O interfaces 240 may provide an interface to elements co-located with coverage manager 112 at a wireless base-station or if coverage manager 112 is located remote to the wireless base-station, elements co-located at the remote location, e.g., at a wireless communication system head end. I/O interfaces 240 may include interfaces that operate according to various communication protocols to communicate over the internal communication link (e.g., Inter-Integrated Circuit (I$^2$C), System Management Bus (SMBus) or Serial Peripheral Interface Bus (SPI), etc.).

I/O interfaces 240 may also provide an interface between coverage manager 112 and elements remote to coverage manager 112. In some examples, as mentioned above for FIGS. 1A-C, wireless network 110 may couple to wireless network 120 via communication channels 160 or 170. The I/O interfaces 240, for example, include an interface configured to operate according to various wireless and/or wired communication protocols to allow coverage manager(s) 112 to communicate over communication channels 160 or 170 (e.g., IEEE, 802.1, IEEE 802.11, IEEE 802.16, GSM, GPRS, EDGE, W-CDMA, HSPA, LTE, CDMA-2000, EV-DO, etc.). In other examples, I/O interfaces 240 may allow coverage manager 112 to communicate to elements such as antenna array 114 if coverage manager 112 is remotely located to antenna array 114, e.g., at a wireless communication system head end.

In some examples, coverage manager 112 includes one or more applications 250 to provide instructions to control logic 220 and/or coverage logic 210. Instructions, for example, may include instructions for coverage manager 112 to implement or use one or more of an interval feature 212, a receive feature 214, a determine feature 216, a request feature 218 or a handoff feature 219.

Figure 3:
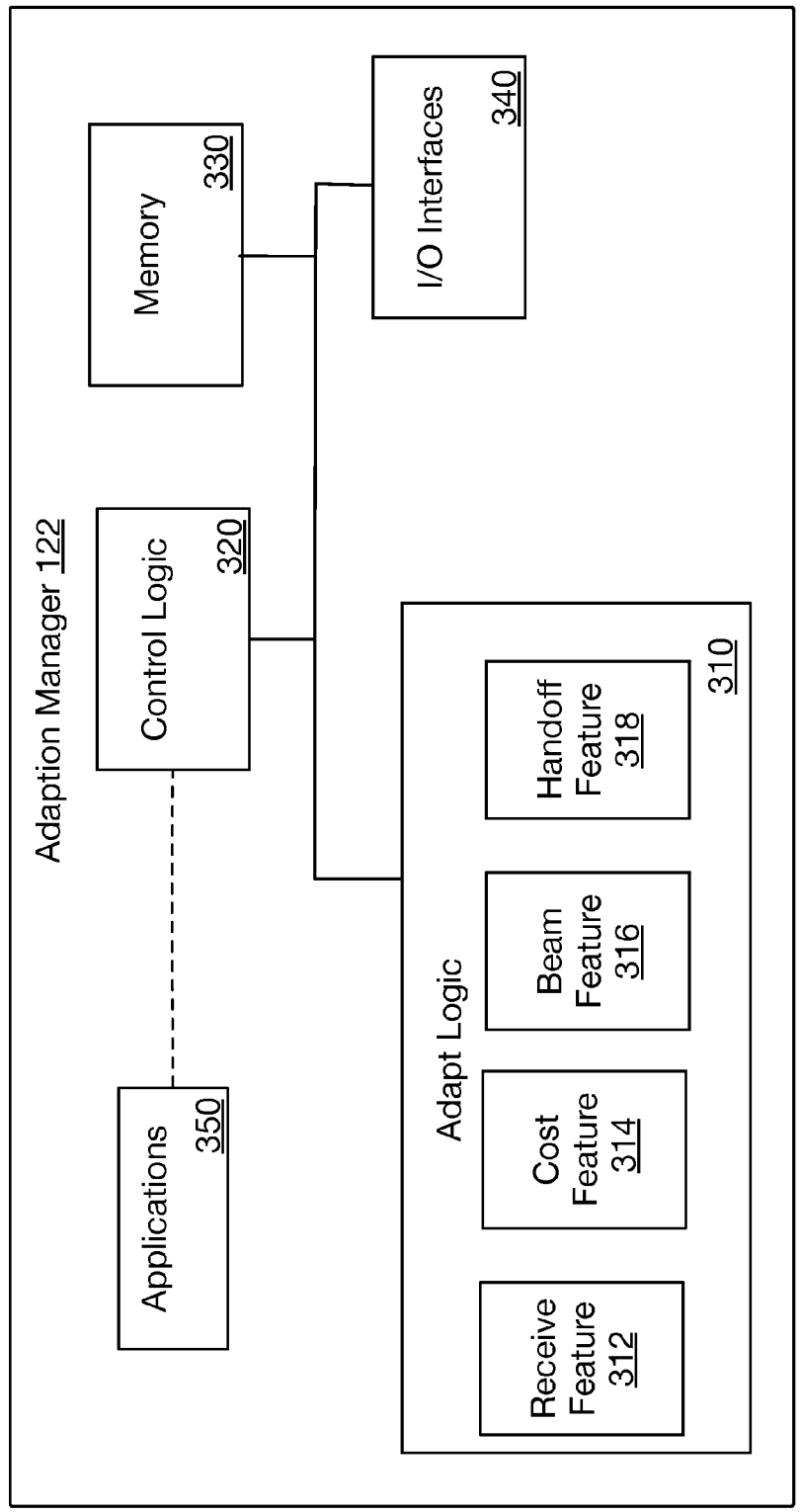
FIG. 3 illustrates a block diagram of an example architecture for an adaption manager.

FIG. 3 illustrates a block diagram of an example architecture for an adaption manager 122. As described above for wireless communication system 100 in FIGS. 1A-C, wireless network 120 may include an adaption manager 122. In some examples, adaption manager 122 includes features and/or logic configured or arranged for a handoff of a wireless device between wireless networks (e.g., wireless networks 110 and 120).

The example adaption manager 122 of FIG. 3 includes adapt logic 310, control logic 320, memory 330, input/output (I/O) interfaces 340 and optionally one or more applications 350. As illustrated in FIG. 3, adapt logic 310 is coupled to control logic 320, memory 330 and I/O interfaces 340. Also illustrated in FIG. 3, the optional applications 350 are arranged in cooperation with control logic 320. Adapt logic 310 may further include one or more of a receive feature 312, a cost feature 314, a beam feature 316 or a handoff feature 318, or any reasonable combination thereof.

In some examples, the elements portrayed in FIG. 3's block diagram are configured to support or enable adaption manager 122 as described in this disclosure. A given adaption manager 122 may include some, all or more elements than those depicted in FIG. 3. For example, adapt logic 310 and control logic 320 may separately or collectively represent a wide variety of logic device(s) to implement the features of adaption manager 122. An example logic device may include one or more of a computer, a microprocessor, a microcontroller, a field programmable gate array (FPGA), an application specific integrated circuit (ASIC), a sequestered thread or a core of a multi-core/multi-threaded microprocessor or a combination thereof.

In some examples, as shown in FIG. 3, adapt logic 310 includes one or more of a receive feature 312, a cost feature 314, a beam feature 316 or a handoff feature 318. Adapt logic 310 may be configured to use one or more of these features to perform operations. As described in more detail below, example operations may include implementing a handoff of a wireless device between a first wireless network and a second wireless network.

In some examples, control logic 320 may be configured to control the overall operation of adaption manager 122. Similar to control logic 220 mentioned above, control logic 320 may represent any of a wide variety of logic device(s) configured to operate in conjunction with executable content or instructions to implement the control of adaption manager 122. In some alternate examples, the features and functionality of control logic 320 may be implemented within adapt logic 310.

According to some examples, memory 330 is arranged to store executable content or instructions. The executable content or instructions may be used by control logic 320 and/or adapt logic 310 to implement or activate features or elements of adaption manager 122. Memory 330 may also be arranged to temporarily maintain information associated with determining whether to accept a handoff request (e.g., predetermined network loads).

Memory 330 may include a wide variety of memory media including, but not limited to, one or more of volatile memory, non-volatile memory, flash memory, programmable variables or states, RAM, ROM, or other static or dynamic storage media.

In some examples, similar to I/O interfaces 240 described above, I/O interfaces 340 may provide an interface via an internal communication medium or link between adaption manager 122 and elements resident on co-located with adaption manager 122. Also similar to I/O interface 240, I/O interfaces 340 may also provide an interface between adaption manager 122 and elements remote to adaption manager 122. In some examples, as mentioned above for FIGS. 1A-C, wireless network 120 may couple to wireless network 110 via communication channels 160 or 170 that may operate according to various wireless and/or wired communication protocols. In other examples, I/O interfaces 340 may allow adaption manager 122 to communicate to elements such as antenna array 124 if adaption manager 122 is remotely located to antenna array 114, e.g., at a wireless communication system head end.

In some examples, adaption manager 122 includes one or more applications 350 to provide instructions to control logic 320 and/or adapt logic 310. Instructions, for example, may include instructions for adaption manager 122 to implement or use one or more of a receive feature 312, a cost feature 314, a beam feature 316 or a handoff feature 318.

Figure 4:
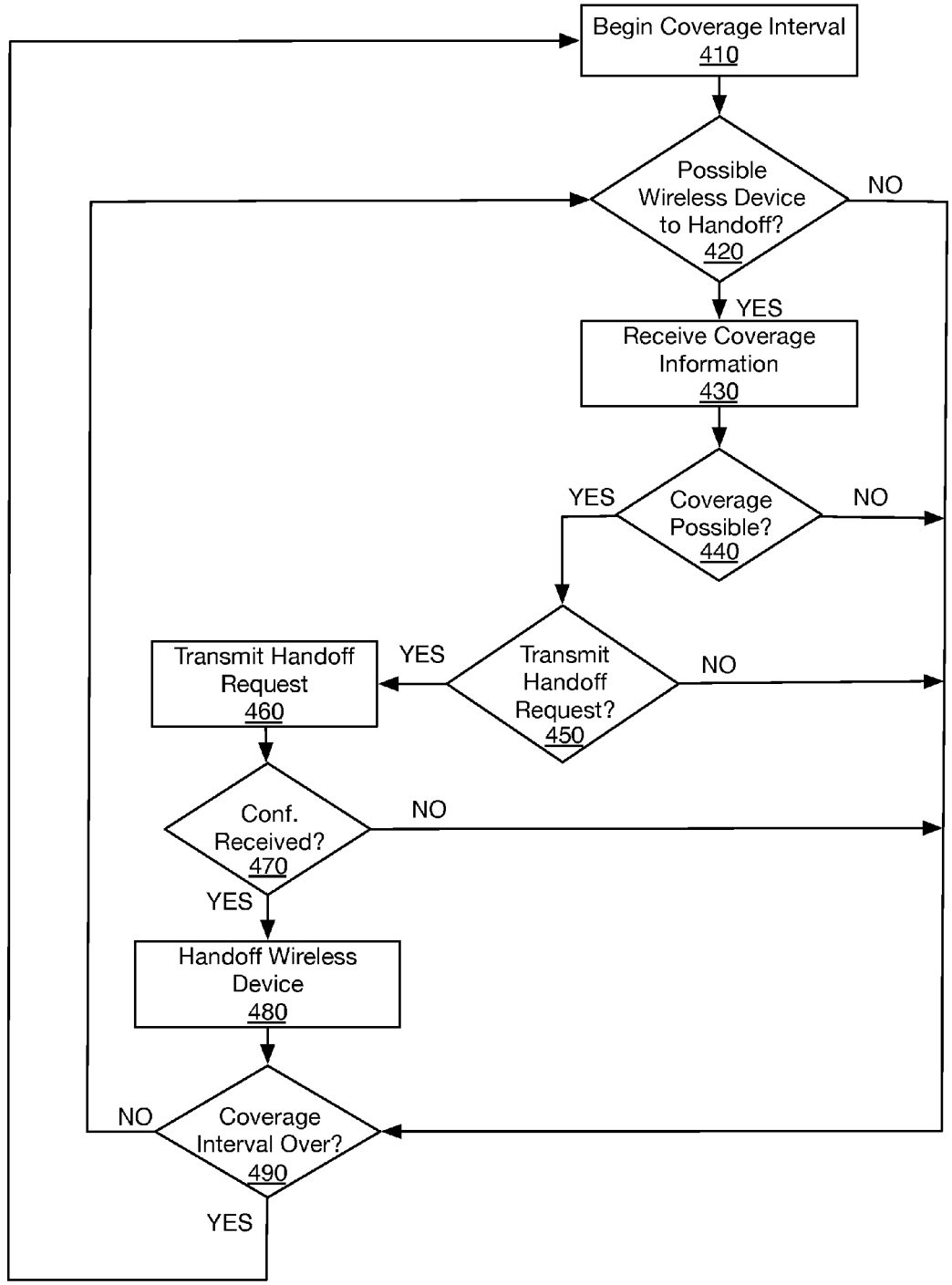
FIG. 4 illustrates a flow chart of example methods implemented at a wireless network to handoff a wireless device to another wireless network.

FIG. 4 illustrates a flow chart of example methods implemented at a wireless network (e.g., wireless network 110) to handoff a wireless device to another wireless network (e.g., wireless network 120). In some examples, wireless communication system 100 as shown in FIGS. 1A-C, is used to illustrate example methods related to the flow chart depicted in FIG. 4. A coverage manager 112 as shown in FIG. 2 may also be used to illustrate the example methods. But the described methods are not limited to implementations on wireless communication system 100 as shown in FIGS. 1A-C or to the coverage manager 112 shown in FIG. 2. The example methods may be implemented on other wireless communication systems having one or more of the elements depicted in FIGS. 1A-C or FIG. 2.

Beginning at block 410 (Begin Coverage Interval), coverage manager 112 may include logic and/or features configured to start a coverage interval (e.g., via interval feature 212). In some examples, the coverage interval may be a time interval that may indicate to coverage manager 112 at wireless network 110 to decide if wireless devices can/should be handed off to another wireless network. The time interval may be based on an amount of time that does not overburden the wireless communication system with excessive overhead yet provides timely information to dynamically adjust to changing network environments (e.g., mobile/moving wireless devices and/or changing network loads).

Continuing from block 410 to decision block 420 (Possible Wireless Device to Handoff?), coverage manager 112 may include logic and/or features configured to determine whether a wireless device may need to be handed over to another wireless network (e.g., via receive feature 214). In some examples, a possible wireless device to handoff may be a wireless device (e.g., wireless device 130A) that is mobile and moving in the direction that may soon take the wireless device out of wireless network 110's coverage area 115. For this example, cover manager 112 may or may not determine that wireless device 130A is a possible handoff candidate to be handed off to wireless network 120. So for the above example, if wireless device 130A is a possible wireless device to handoff, the processing may continue from decision block 420 to block 430. Otherwise, processing moves to decision block 490.

Continuing from decision block 420 to block 430 (Receive Coverage Information), coverage manager 112 may include logic and/or features configured to receive coverage information associated with the wireless device to possibly handoff to wireless network 120 (e.g., via receive feature 214). In some examples, as mentioned above for FIGS. 1A-C, the coverage information may include a coverage map generated based on information received from wireless devices 130A-130H. Also the coverage information may include additional information associated with a physical location of wireless device 130A and/or an indication that wireless device 130A does not detect a signal from wireless network 120.

Continuing from block 430 to decision block 440 (Coverage Possible?), coverage manager 112 may include logic and/or features configured to determine whether wireless device 130A was in a coverage area (e.g., coverage area 125-1) that was covered by wireless network 120 in the past (e.g., via determine feature 216). In some examples, the coverage map may be used to determine the potential for coverage by wireless network 120. If the coverage map indicates that wireless device 130A may be covered by wireless network 120, processing may continue from decision block 440 to decision block 450. Otherwise, processing moves to decision block 490.

Continuing from decision block 440 to decision block 450 (Transmit Handoff Request?), coverage manager 112 may include logic and/or features configured to determine whether to transmit a handoff request to wireless network 120 (e.g., via request feature 218). In some examples, coverage manager 112 may assess various criteria to determine whether a handoff of wireless device is cost effective or beneficial to wireless device 130A and/or wireless network 110. The criteria may include an estimated cost to handoff wireless device 130A to wireless network 120. For example, wireless device 130A may not be a contracted user with a service provider that operates wireless network 120 and a high fee (e.g., roaming charge) may make a handoff unacceptably costly. The criteria may also include estimated signal strength from wireless network 120 if the handoff request is accepted. The criteria may further include whether wireless device 130A is mobile or stationary. For example, if wireless device 130A is mobile and coverage information indicates wireless device 130A is moving towards wireless network 120 it may be beneficial to request a handoff. If a handoff request is to be transmitted to wireless network 120, processing may continue from decision block 450 to block 460. Otherwise, processing moves to decision block 490.

Continuing from decision block 450 to block 460 (Transmit Handoff Request), coverage manager 112 may include logic and/or features configured to transmit the handoff request (e.g., via request feature 218) to wireless network 120. In some examples, the handoff request may be transmitted via communication channel 160 that may include the use of wireless device 140A as a relay. In other examples, the handoff request may be transmitted via communication channel 170. Also, the handoff request may include location or other information to allow wireless network 120 to possibly determine how the one or more beams of antenna array 124 may be adapted to cover wireless device 130A.

Continuing from block 460 to decision block 470 (Conf. Received?), coverage manager 112 may include logic and/or features configured to determine whether a confirmation has been received from wireless network 120 (e.g., via receive feature 218). In some examples, the received confirmation indicates to coverage manager 112 that the handoff request has been accepted for the handoff of wireless device 130A to wireless network 120. The confirmation may also indicate that wireless network 120 has adapted its coverage area to now cover the location of wireless device 130A. Coverage manager 112 may also include logic and/or features configured to start a confirmation interval (e.g., via interval feature 212) that establishes a period of time to wait for a confirmation. If a confirmation is received from wireless network 120 before the confirmation interval expires, processing may continue from decision block 470 to block 480. Otherwise, if the confirmation interval expires and no confirmation has been received, processing moves to decision block 490.

Continuing from decision block 470 to block 480 (Handoff Wireless Device), coverage manager 112 may include logic and/or features configured to handoff wireless device 130A to wireless network 120 (e.g., via handoff feature 219). In some examples, coverage manager 112 may be configured to follow protocols/procedures as described in operating agreements between operators of wireless networks 110 and 120 to conduct the handoff. Also, various industry standards may be followed to conduct the handoff (e.g., IEEE 802.16, GSM, GPRS, EDGE, W-CDMA, HSPA, LTE, CDMA-2000, EV-DO, etc).

Moving from block 480 to decision block 490 (Coverage Interval Over?), coverage manager 112 may include logic and/or features configured to determine whether the coverage interval is over (e.g., via interval feature 212). In some examples, as mentioned above, the coverage interval may be a time interval that may indicate to coverage manager 112 at wireless network 110 to decide if wireless devices can/should be handed off to another wireless network. If the coverage interval is over, the process moves to block 410 and a new interval begins or is started. Otherwise, if the coverage interval is not yet over, the process moves to decision block 420 and other wireless devices coupled to wireless network 110 may be considered for a handoff.

Figure 5:
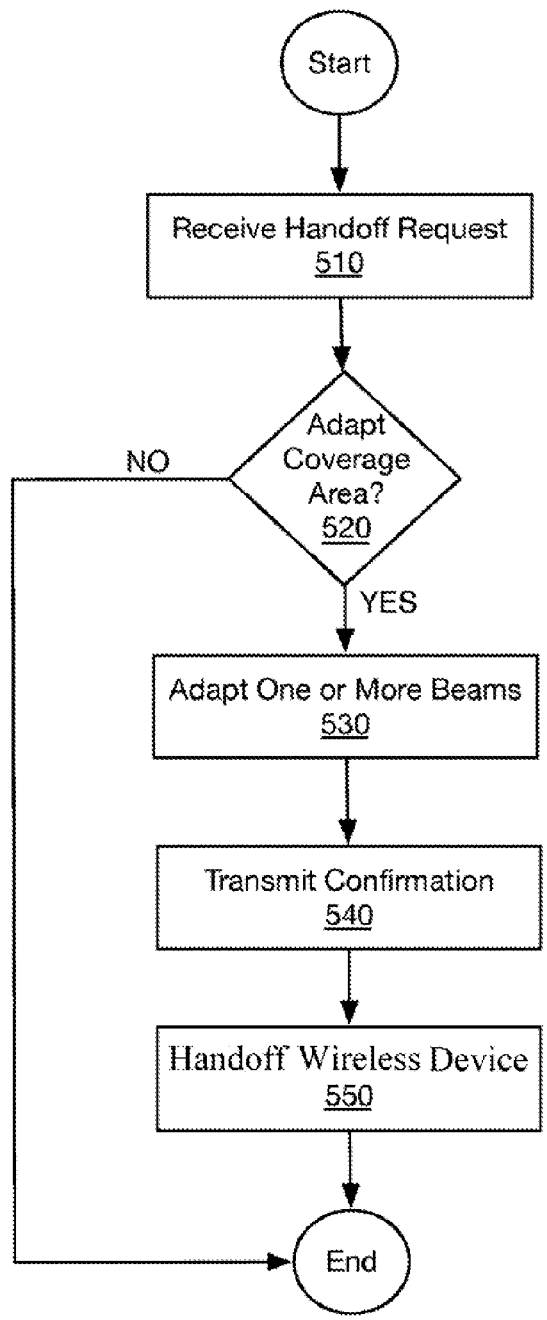
FIG. 5 illustrates a flow chart of example methods implemented at the other wireless network for the wireless device handoff between the other wireless network and the wireless network.

FIG. 5 illustrates a flow chart of example methods implemented at a wireless network (e.g., wireless network 120) for a wireless device handoff between another wireless network (e.g., wireless network 110) and the wireless network. In some examples, wireless communication system 100 as shown in FIGS. 1A-C, is used to illustrate example methods related to the flow chart depicted in FIG. 5. An adaption manager 122 as shown in FIG. 3 may also be used to illustrate the example methods. But the described methods are not limited to implementations on wireless communication system 100 as shown in FIGS. 1A-C or to the adaption manager 122 shown in FIG. 3. The example methods may be implemented on other wireless communication systems having one or more of the elements depicted in FIGS. 1A-C or FIG. 3.

Moving from the start to block 510 (Receive Handoff Request), adaption manager 122 of wireless network 120 may include logic and/or features configured to receive a handoff request from wireless network 110 (e.g., via receive feature 312). In some examples, the handoff request may be based on a determination by wireless network 110 that wireless device 130A is not currently covered by wireless network 120 (e.g., coverage area 125-2) but is capable of being covered by wireless network 120 (e.g., coverage area 125-1). As mentioned above, the handoff request may be received via either communication channel 160 or 170.

Continuing from block 510 to decision block 520 (Adapt Coverage Area?), adaption manager 122 may include logic and/or features configured to determine whether to adapt the coverage area for wireless network 120 (e.g., via cost feature 314). In some examples, adaption manager 122 may evaluate the costs associated with a handoff of wireless device 130A to wireless network 120 and base a determination on the associated costs. Those costs may be based on criteria to include a predetermined network load placed on wireless network 120 if wireless device 130A is handed off. The costs may also be based on an effect of adapting the coverage area on other wireless devices coupled to wireless network 120 (e.g., wireless device 140A-I). If a determination is made by adaption manager 122 to adapt the coverage area, processing continues from decision block 520 to block 530. Otherwise, processing comes to an end.

Continuing from decision block 520 to block 530 (Adapt One or More Beams), adaption manager 122 may include logic and/or features configured to adapt one or more beams generated from or by antenna array 124 to facilitate coverage of wireless device 130A by wireless network 120 (e.g., via beam feature 316). In some examples, a combination of beams generated by antenna array 124 may be directional beams. For these examples, adaption manager 122 may cause at least one of the directional beams to be adapted in order to change the coverage area (e.g., similar to coverage area 125-1) of wireless network 120 to enable wireless device 130A to be covered by wireless network 120.

Continuing from block 530 to block 540 (Transmit Confirmation), adaption manager 122 may include logic and/or features configured to transmit a confirmation to indicate acceptance of the handoff request from wireless network 110 for wireless device 130A (e.g., via beam feature 316). In some examples, the confirmation may be transmitted via communication channel 160 or 170 and may indicate acceptance of the handoff request. The confirmation may also indicate that wireless network 120's coverage area has been adapted to now cover wireless device 130A.

Continuing from block 540 to block 550 (Handoff Wireless Device), adaption manager 122 may include logic and/or features configured to handoff wireless device 130A from wireless network 110 (e.g., via handoff feature 318). In some examples, adaption manager 122 may be configured to follow protocols/procedures as described in operating agreements between operators of wireless networks 110 and 120 to conduct the handoff. Also, various industry standards may be followed to conduct the handoff. The process then moves from block 550 and comes to an end.

FIG. 6 illustrates a block diagram of an example computer program product 600. In some examples, as shown in FIG. 6, computer program product 600 includes a signal bearing medium 602 that may also include instructions 604 for a first wireless network (e.g., wireless network 110) to handoff a wireless device (e.g., wireless device 130A) to a second wireless network (e.g., wireless network 120). Instructions 604, which, when executed by logic (e.g., coverage logic 210), may cause the logic to receive coverage information associated with the wireless device. The instructions 604 may also cause the logic to determine whether the wireless device is possibly covered by the second wireless network based, at least in part, on the coverage information. The instructions 604 may also cause the logic to transmit a handoff request to the second wireless network based, at least in part, on a determination that the wireless device is possibly covered by the second wireless network.

Also depicted in FIG. 6, in some examples, computer product 600 may include one or more of a computer readable medium 606, a recordable medium 608 and a communications medium 610. The dotted boxes around these elements depict different types of mediums included within, but not limited to, signal bearing medium 602. These types of mediums may distribute instructions 604 to be executed by logic (e.g., coverage logic 210). Computer readable medium 606 and recordable medium 608 may include, but are not limited to, a flexible disk, a hard disk drive (HDD), a Compact Disc (CD), a Digital Versatile Disk (DVD), a digital tape, a computer memory, etc. Communications medium 610 may include, but is not limited to, a digital and/or an analog communication medium (e.g., a fiber optic cable, a waveguide, a wired communication link, a wireless communication link, etc.).

Figure 7:
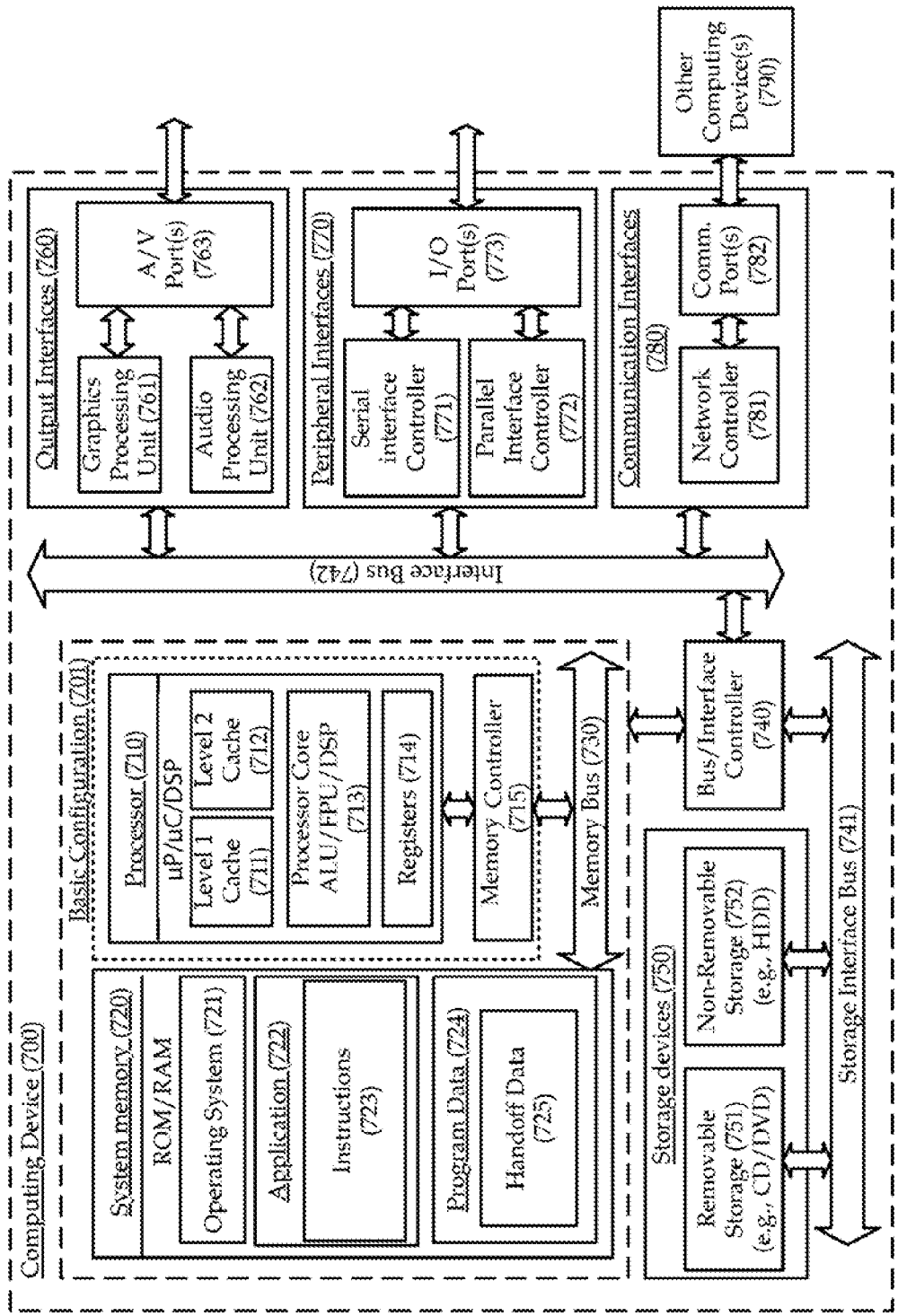
FIG. 7 illustrates an example computing device; all arranged in accordance with the present disclosure.

FIG. 7 illustrates an example computing device 700. In some examples, coverage manager 112 or adaption manager 122 depicted in FIGS. 1A-C, FIG. 2 or FIG. 3 may be implemented on computing device 700. In these examples, elements of computing device 700 may be arranged or configured for a wireless device handoff between a first wireless network and a second wireless network. In a very basic configuration 701, computing device 700 typically includes one or more processors 710 and system memory 720. A memory bus 730 can be used for communicating between the processor 710 and the system memory 720.

Depending on the desired configuration, processor 710 can be of any type including but not limited to a microprocessor (μP), a microcontroller (μC), a digital signal processor (DSP), or any combination thereof. Processor 710 can include one or more levels of caching, such as a level one cache 711 and a level two cache 712, a processor core 713, and registers 714. The processor core 713 can include an arithmetic logic unit (ALU), a floating point unit (FPU), a digital signal processing core (DSP Core), or any combination thereof. A memory controller 715 can also be used with the processor 710, or in some implementations the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 typically includes an operating system 721, one or more applications 722, and program data 724. Application 722 includes instructions 723 that are arranged to perform the functions as described herein including the actions described with respect to coverage manager 112 architecture shown in FIG. 2, adaption manager 122 architecture shown in FIG. 3 or including the actions described with respect to the flow charts shown in FIGS. 4 and 5. Program Data 724 includes handoff data 725 that is useful for implementing instructions 723 (e.g., determining whether to handoff, coordinating or executing handoffs between wireless networks). In some examples, application 722 can be arranged to operate with program data 724 on an operating system 721 such that implementations for a wireless device handoff between a first wireless network and a second wireless network may be provided as described herein. This described basic configuration is illustrated in FIG. 7 by those components within dashed line 701.

Computing device 700 can have additional features or functionality, and additional interfaces to facilitate communications between the basic configuration 701 and any required devices and interfaces. For example, a bus/interface controller 740 can be used to facilitate communications between the basic configuration 701 and one or more data storage devices 750 via a storage interface bus 741. The data storage devices 750 can be removable storage devices 751, non-removable storage devices 752, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data.

System memory 720, removable storage 751 and non-removable storage 752 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700 (e.g., coverage maps). Any such computer storage media can be part of device 700.

Computing device 700 can also include an interface bus 742 for facilitating communication from various interface devices (e.g., output interfaces, peripheral interfaces, and communication interfaces) to the basic configuration 701 via the bus/interface controller 740. Example output interfaces 760 include a graphics processing unit 761 and an audio processing unit 762, which can be configured to communicate to various external devices such as a display or speakers via one or more A/V ports 763. Example peripheral interfaces 770 include a serial interface controller 771 or a parallel interface controller 772, which can be configured to communicate with external devices such as input devices (e.g., keyboard, mouse, pen, voice input device, touch input device, etc.) or other peripheral devices (e.g., printer, scanner, etc.) via one or more I/O ports 773. An example communication interface 780 includes a network controller 781, which can be arranged to facilitate communications with one or more other computing devices 790 over a network communication via one or more communication ports 782. A network communication connection is one example of a communication media. Communication media may typically be embodied by computer readable instructions, data structures, program modules, or other data in a modulated data signal, such as a carrier wave or other transport mechanism, and includes any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media. The term computer readable media as used herein can include both storage media and communication media.

Computing device 700 can be implemented as a portion of a personal computer including both laptop computer and non-laptop computer configurations or implemented in a workstation or a server configuration. In some examples, computing device 700 may be included in or associated with a base-station for a wireless network (e.g., wireless networks 110 or 120). In other examples, computing device 700 may be part of a wireless communication system head end that may control/manage a wireless network.

References made in this disclosure to the term "responsive to" or "in response to" are not limited to responsiveness to a particular feature and/or structure. A feature may also be responsive to another feature and/or structure and also be located within that feature and/or structure. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

Those skilled in the art will recognize that it is common within the art to describe devices and/or processes in the fashion set forth herein, and thereafter use engineering practices to integrate such described devices (e.g., transmitters, receivers, wireless devices, computing platforms, computing devices, etc.) and/or methods into data processing systems. That is, at least a portion of the devices and/or methods described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available component, such as those typically found in data computing/communication and/or network computing/communication systems.

The herein described subject matter sometimes illustrates different components or elements contained within, or connected with, different other components or elements. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method implemented at a first wireless network to handoff a mobile wireless device to a second wireless network, the method comprising:
    receiving coverage information associated with the wireless device;
    determining whether the wireless device is capable of being covered by the second wireless network based, at least in part, on the received coverage information, wherein the determining includes determining that the wireless device is not currently covered by the second wireless network but is capable of being covered by the second wireless network; and
    transmitting a handoff request to the second wireless network based, at least in part, on the determination that the wireless device is capable of being covered by the second wireless network,
    wherein the coverage information includes mapping information of one or more locations of the wireless device for which the second wireless network has previously had coverage.

2. A method according to claim 1, further comprising:
    receiving a confirmation from the second wireless network that the handoff request has been accepted by the second wireless network, wherein based, at least in part, on the received confirmation, the wireless device is handed off to the second wireless network.

3. A method according to claim 1, wherein the coverage information includes location information of the wireless device and an indication that the wireless device does not detect a signal from the second wireless network.

4. A method according to claim 1, wherein the mapping information of one or more locations for which the second wireless network has previously had coverage comprises a map generated based, at least in part, on information received from one or more wireless devices communicatively coupled to the first wireless network and covered by the second wireless network, wherein covered by the second wireless network includes a detectable signal from the second wireless network to the one or more wireless devices.

5. A method according to claim 1, wherein the transmitting the handoff request comprises transmitting the handoff request based, at least in part, on at least one of an estimated cost to handoff the wireless device to the second wireless network, or an estimated signal strength from the second wireless network at the location of the wireless device if the handoff request is accepted.

6. A method according to claim 1, wherein the transmitting the handoff request comprises transmitting the handoff request via a wireless or a wired communication link that communicatively couples the first wireless network to the second wireless network.

7. A method according to claim 1, wherein the transmitting the handoff request comprises transmitting the handoff request via another mobile wireless device that is configured to be communicatively coupled to both the first wireless network and the second wireless network, wherein the another mobile wireless device serves as a relay between the first wireless network and the second wireless network.

8. A method according to claim 1, wherein the first wireless network is a different type of wireless network than the second wireless network.

9. A method implemented at a first wireless network for a mobile wireless device handoff between a second wireless network and the first wireless network, the method comprising:
    receiving a handoff request from the second wireless network, the handoff request based, at least in part, on a determination by the second wireless network that the wireless device is not currently covered by the first wireless network but is capable of being covered by the first wireless network;
    based, at least in part, on the handoff request, adapting one or more beams of an antenna array to facilitate coverage of the wireless device by the first wireless network; and
    transmitting a confirmation from the first wireless network to the second wireless network to indicate acceptance of the handoff request, wherein the wireless device is handed off from the second wireless network to the first wireless network.

10. A method according to claim 9, wherein the receiving the handoff request comprises receiving the handoff request via a wireless or a wired communication link that communicatively couples the first wireless network to the second wireless network.

11. A method according to claim 9, wherein the receiving the handoff request comprises receiving the handoff request via another mobile wireless device that is configured to be communicatively coupled to both the first wireless network and the second wireless network, wherein the another mobile wireless device serves as a relay between the first wireless network and the second wireless network.

12. A method according to claim 9, wherein the adapting one or more beams comprises adapting one or more beams based, at least in part, on one of a predetermined network load placed on the first wireless network due to the handoff of the wireless device or an effect of adapting one or more beams on other wireless devices currently communicatively coupled to the first wireless network.

13. An apparatus for a first wireless network to handoff a wireless device to a second wireless network, the apparatus comprising:
a coverage manager having logic, the logic configured to:
receive coverage information associated with the wireless device;
determine whether the wireless device is capable of being covered by the second wireless network based, at least in part, on the coverage information, wherein the logic is further configured to determine that the wireless device is not currently covered by the second wireless network but is capable of being covered by the second wireless network; and
transmit a handoff request to the second wireless network based, at least in part, on the determination that the wireless device is capable of being covered by the second wireless network,
wherein the coverage information includes mapping information of one or more locations of the wireless device for which the second wireless network has previously had coverage.

14. An apparatus according to claim 13, wherein the logic is further configured to:
receive a confirmation that the handoff request has been accepted by the second wireless network, wherein the wireless device is handed off to the second wireless network.

15. An apparatus according to claim 13, wherein the coverage information includes location information of the wireless device and an indication that the wireless device does not detect a signal from the second wireless network.

16. An apparatus according to claim 13, wherein the logic is further configured to generate the mapping information based, at least in part, on information received from wireless devices communicatively coupled to the first wireless network and covered by the second wireless network, wherein covered by the second wireless network includes a detectable signal from the second wireless network to the wireless devices.

17. An apparatus according to claim 13, wherein the logic is further configured to transmit a handoff request based, at least in part, on at least one of an estimated cost to handoff the wireless device to the second wireless network, an estimated signal strength from the second wireless network at the location of the wireless device if the handoff request is accepted, or whether the wireless device is a mobile wireless device.

18. An apparatus according to claim 13, wherein the logic is further configured to transmit a handoff request via a wireless or a wired communication link that communicatively couples the first wireless network to the second wireless network.

19. An apparatus according to claim 13, wherein the logic is further configured to transmit a handoff request via another wireless device that is configured to be communicatively coupled to both the first wireless network and the second wireless network, wherein the another wireless device serves as a relay between the first wireless network and the second wireless network.

20. A system for a wireless device handoff between a first wireless network and a second wireless network, the system comprising:
an antenna array configured to generate one or more adaptable beams to modify a coverage area for the first wireless network; and
an adaption manager having logic, the logic configured to:
receive a handoff request from the second wireless network, the handoff request based, at least in part, on a determination by the second wireless network that the wireless device is capable of being covered by the first wireless network,
cause a beam from among the one or more adaptable beams to be adapted in order to enable the wireless device to be covered by the first wireless network, and
transmit a confirmation to the second wireless network to indicate acceptance of the handoff request, wherein the wireless device is handed off from the second wireless network to the first wireless network.

21. A system according to claim 20, wherein to receive the handoff request comprises to receive the handoff request via a wireless or a wired communication link that communicatively couples the first wireless network to the second wireless network.

22. A system according to claim 20, wherein to receive the handoff request comprises to receive the handoff request via another wireless device that is configured to be communicatively coupled to both the first wireless network and the second wireless network, wherein the another wireless device serves as a relay between the first wireless network and the second wireless network.

23. A system according to claim 20, wherein to cause the beam to be adapted comprises to cause a beam to be adapted based, at least in part, on one of a network load placed on the first wireless network due to the handoff of the wireless device or an impact of adapting one or more beams on other wireless devices currently communicatively coupled to the first wireless network.

24. A computer program product comprising a non-transitory medium having instructions for a first wireless network to handoff a wireless device to a second wireless network, which, when executed by logic, cause the logic to:
receive coverage information associated with the wireless device;
determine whether the wireless device is capable of being covered by the second wireless network based, at least in part, on the coverage information, wherein to determine comprises to determine that the wireless device is not currently covered by the second wireless network but is capable of being covered by the second wireless network; and
transmit a handoff request to the second wireless network based, at least in part, on a determination that the wireless device is capable of being covered by the second wireless network,
wherein the coverage information includes mapping information of one or more locations of the wireless device for which the second wireless network has previously had coverage.

25. A computer program product according to claim 24, further comprising instructions to cause the logic to receive a confirmation that the handoff request has been accepted by the second wireless network, wherein the wireless device is handed off to the second wireless network.

26. A computer program product according to claim 24, wherein the coverage information includes location information of the wireless device and an indication that the wireless device does not detect a signal from the second wireless network.

27. A computer program product according to claim 24, wherein the mapping information of one or more locations for which the second wireless network has had coverage in the past comprises a map generated based on information received from one or more wireless devices communicatively coupled to the first wireless network and covered by the second wireless network, wherein covered by the second wireless network detection of a detectable signal from the second wireless network to the one or more wireless devices.

28. A computer program product according to claim 24, further comprising instructions to cause the logic to transmit a handoff request via a wireless or a wired communication link that communicatively couples the first wireless network to the second wireless network.

29. A computer program product according to claim 24, further comprising instructions to cause the logic to transmit a handoff request via another wireless device that is configured to be communicatively coupled to both the first wireless network and the second wireless network, wherein the another wireless device serves as a relay between the first wireless network and the second wireless network.

* * * * *